United States Patent [19]

Angeletti et al.

[11] 4,014,431
[45] Mar. 29, 1977

[54] SPIRAL TUBE CONVEYOR

[76] Inventors: Eugene Angeletti; Eugene Angeletti, Jr., both of R.D. No. 1, Marianna, Pa. 15345

[22] Filed: Aug. 29, 1975

[21] Appl. No.: 608,974

[52] U.S. Cl. .................................. 198/660; 198/658
[51] Int. Cl.² ........................................ B65G 33/12
[58] Field of Search ............... 198/15, 64, 213–216

[56] References Cited

UNITED STATES PATENTS

| | | | |
|---|---|---|---|
| 1,330,219 | 2/1920 | Rockwell | 198/215 X |
| 2,290,806 | 7/1942 | Hodgin | 198/213 |
| 2,443,288 | 6/1948 | Anderson | 198/213 |
| 2,443,942 | 6/1948 | Winkler et al. | 198/213 X |
| 2,665,796 | 1/1954 | Anderson | 198/215 |
| 2,845,167 | 7/1958 | Heiken | 198/15 X |
| 3,056,588 | 10/1962 | Alexandrovsky | 198/213 |

FOREIGN PATENTS OR APPLICATIONS 249,265  9/1970  U.S.S.R. ............................ 198/213

Primary Examiner—Evon C. Blunk
Assistant Examiner—Richard K. Thomson
Attorney, Agent, or Firm—Birch, Stewart, Kolasch & Birch

[57] ABSTRACT

An expandable and retractable conveyor system which comprises a main spiral-type tube conveyor which includes a cylindrical shell containing a screw element which is integral with the cylindrical shell and extends radially from said shell toward the center thereof and at least one additional spiral-type tube conveyor which includes a cylindrical shell containing a screw element which is integral with the cylindrical shell and extends radially from said shell toward the center thereof, said additional spiral-type tube conveyor being slightly smaller than the main spiral-type tube conveyor, with the screw element thereof being in screw-engaging relationship with the screw element of the main spiral-type tube conveyor.

18 Claims, 7 Drawing Figures

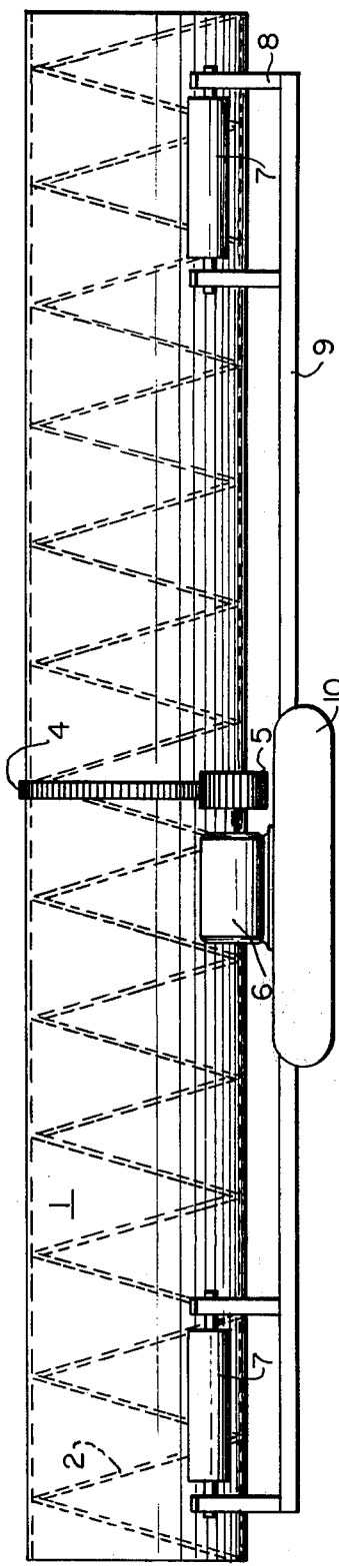
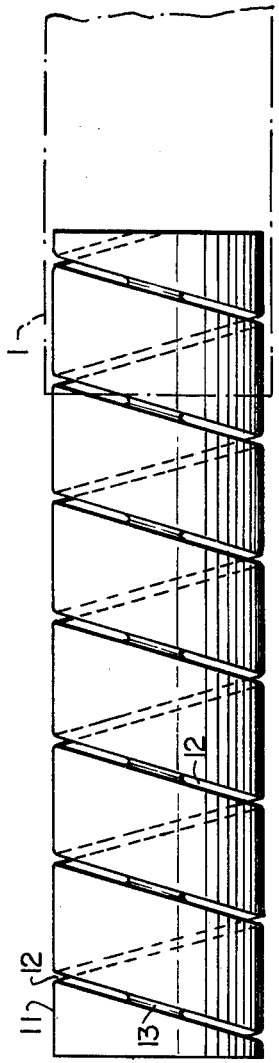
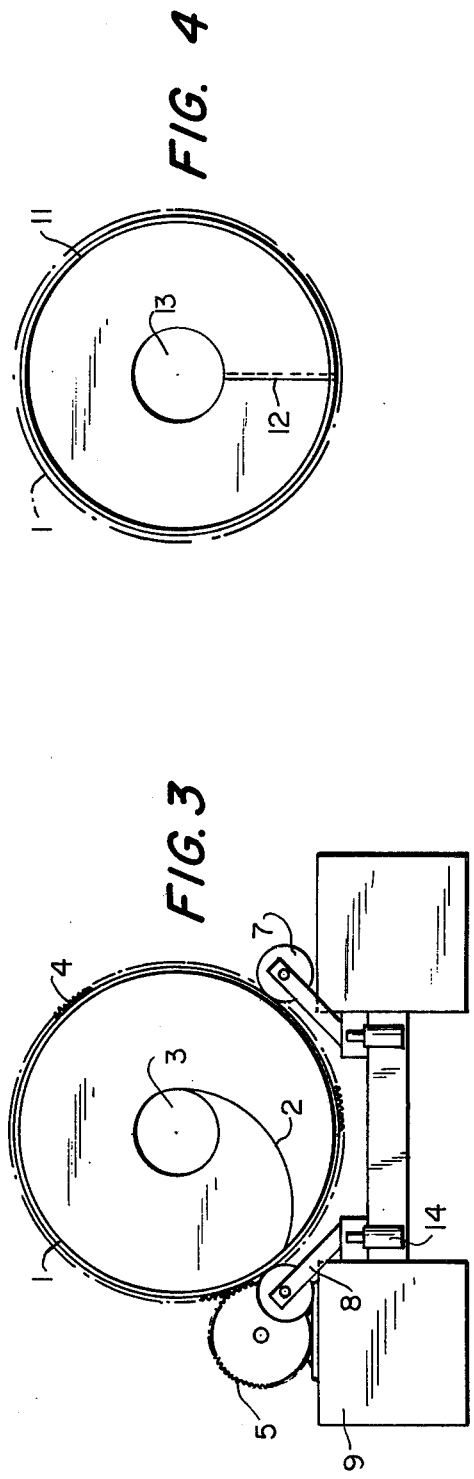

SPIRAL TUBE CONVEYOR

BACKGROUND AND SUMMARY OF THE INVENTION

The present invention is related to a spiral tube conveyor which can be used for moving any granular-type material from one location to another. More particularly, the present invention is directed to a spiral tube conveyor which can be either lengthened or shortened during its conveying operation.

Various types of conveyors for moving materials such as granular products, coal, ore, agricultural grains, farm silage, and the like, are well known in the art. The common conveyor comprises a screw mounted on a shaft which is rotatably disposed within a tube or cylindrical shell. In such devices, the material to be conveyed is introduced into one end of the conveyor and is conveyed to the other end of the conveyor by the rotation of the screw element disposed therein. However, in using the well known screw conveyor device, a number of problems have been encountered. For example, in the operation of the central screw element within the cylindrical shell of the conveyor, frequently the material being conveyed tends to collect between the peripheral edge of the screw element and the inside surface of the cylindrical shell, thereby adversely affecting the smooth rotation of the screw and, in some instances, causing a complete stoppage in the rotation of the screw element caused by the binding effect produced by said material. Also, if the material being conveyed contains a certain amount of moisture, it tends to compact between the convolutions of the screw element which again causes a binding effect within the screw element which can seriously affect the operation of the conveyor.

It has also been found that during a conveying operation it frequently would be desirable to either lengthen or shorten the conveying device in order to better accommodate the particular conveying operation. For example, in the mining of coal, as the mining operation proceeds, it would be desirable if the conveying device could be extended so as to follow the progress of the mining operation without the necessity of completely relocating the conveyor.

Accordingly, one of the objects of the present invention is to provide a spiral-type tube conveyor which eliminates all of the problems of the prior art as set forth hereinabove.

Another object of the present invention is to provide a spiral-type tube conveyor which eliminates binding problems between adjacent convolutions of the screw element or between the screw element and the cylindrical shell of the conveyor.

A further object of the present invention is to provide a spiral-type tube conveyor which can be lengthened or shortened at the site location, thereby readily adapting the conveyor to the mining progress made during the conveying operation.

Still another object of the present invention is to provide a spiral-type tube conveyor which is portable in nature and thus can be readily transferred from one location to another.

A still further object of the present invention is to provide a spiral-type tube conveyor which can effectively operate on an inclined plane while at the same time being capable of substantially increasing the conveying capability of the prior art devices.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from the detailed description.

The spiral-type tube conveyor of the present invention comprises a cylindrical shell, containing a screw-type element, the periphery of said screw-type element being fixed to the inside circumferential surface of the cylindrical shell. When the screw element is affixed within the cylindrical shell, it defines a central aperture which extends along the entire length of the conveying device and which is generally coaxially disposed with respect to the cylindrical shell. The spiral-type tube conveyor of the present invention is rotated by associating a driving means with the outer circumferential surface of the cylindrical shell. Thus, in the conveyor of the present invention, both the cylindrical shell and the screw element attached thereto rotate in order to achieve the desired conveying operation. Because of the particular arrangement of the conveying device of the present invention, the use of an axis for mounting and driving the screw element is completely eliminated, thereby leaving a centrally disposed aperture through which large lumps of material and compacted material can be transferred during the conveying operation to avoid jamming of the conveying device and disrupting the entire conveying operation.

The screw element of the spiral-type tube conveyor of the present invention can be a separately manufactured element which is secured, e.g., welded, to the inside peripheral surface of the cylindrical shell or can be pressed out of the shell itself by any well-known manner. In any event, in its operational state, the screw element is integral with the peripheral inside surface of the cylindrical shell.

In one of the particularly advantageous features of the present invention, the spiral-type tube conveyor discussed above, i.e., the main conveyor, can be used together with at least one additional spiral-type tube conveyor in order to provide an overall conveying device which can be lengthened or shortened depending upon the particular needs of the situation. The additional conveyor comprises a cylindrical shell in which the screw element is pressed out of the cylindrical shell itself. To help understand this particular structure, one should visualize a cylindrical tube which contains a spiral line drawn on the outer surface of the tube. Then, if one were to press on said spiral line inwardly toward the center of the tube, the result would be a substantially U-shaped groove which extends toward the center of the tube and extends along the peripheral surface of said tube with a spiral configuration. If the U-shaped groove is pressed from the tube itself, it will be apparent that in order to conform the diameter of this conveyor to the main conveyor discussed hereinabove, the diameter of the tube before the pressing operation must be much larger in order to provide enough tube to accommodate the grooves which are to be pressed therein. In order for the two conveyors to be combined into a single conveyor which can be lengthened or shortened, the additional conveyor of the present invention must have a shell diameter which is slightly smaller than that of the main conveyor discussed above so that it can be readily screwed into said main conveyor. Thus, the additional conveyor which contains the U-shaped pressed-in screw can be readily screwed into the main conveyor because the screw of the main conveyor, which is attached to the inside peripheral wall of the cylindrical shell, is received into the pressed-in, U-shaped screw of said additional conveyor. Since the U-shaped screw is pressed toward the center of the tube a distance at least slightly greater than the distance thè screw of the main conveyor extends toward the center of the main conveyor, the additional screw element forms a female receptacle which receives the male screw element of the main conveyor. As can be readily visualized, an additional screw element can be screwed into both ends of the main conveyor, thus making it possible to increase the length of the spiral-tube conveyor by almost 100%. It can be readily realized that although the present invention advantageously utilizes a combination of screw elements to produce a conveyor which can be varied in its length, any of the elements mentioned above, that is the main conveyor or the additional conveyors, can be utilized independent of the other conveyors to produce an effective conveying device.

When the various conveyors are utilized in combination, the main conveyor can be disposed as a central unit with the additional conveyors being adapted to be screwed into both ends of said main conveyor. Various well-known, hydraulic means can be utilized for moving the various conveyors relative to each other, i.e., for screwing the additional conveyors into the main conveyor. Also, belt conveyors can be associated with either ends of the spiral-type conveyor of the present invention to facilitate loading and unloading of the conveyor.

BRIEF DESCRIPTION OF THE DRAWINGS

The present invention will become more fully understood from the detailed description given hereinbelow and the accompanying drawings which are given by way of illustration only, and thus are not limitative of the present invention, and wherein, FIG. 1 shows the main spiral tube conveyor of the present invention wherein the screw element is attached to the inside peripheral surface of the cylindrical shell. This conveyor functions as the central section when it is used in combination with additional conveyors, FIG. 2 shows an additional conveyor which comprises a cylindrical shell wherein a spiral, U-shaped channel is pressed into the outer peripheral surface of said cylindrical shell;

FIG. 3 shows an axial end view of FIG. 1;

FIG. 4 shows an axial end view of FIG. 2;

DESCRIPTION OF THE PREFERRED EMBODIMENTS

Figure 5:
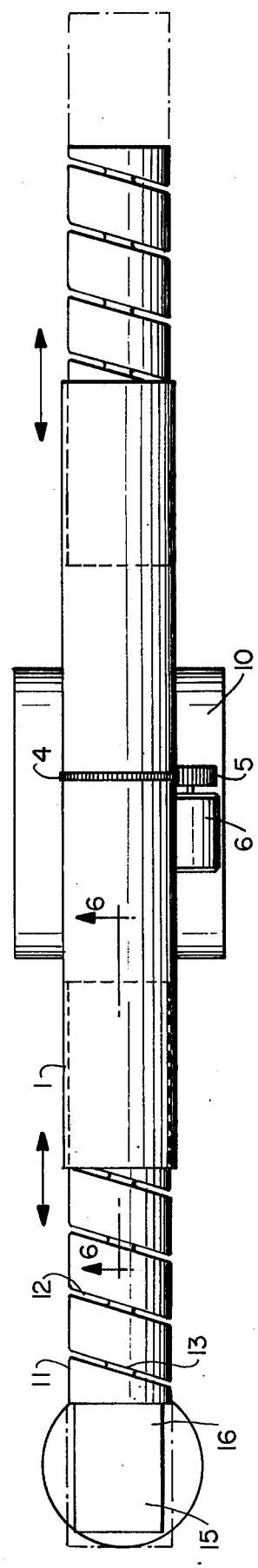
FIG. 5 shows how the conveyors of FIGS. 1 and 2 cooperate to form an extendable, spiral-tube conveyor.

Referring now to the drawings, wherein like reference numerals are used throughout the various views to indicate like parts, the spiral-type tube conveyor of the present invention comprises a main conveyor which includes a hollow, cylindrical sleeve or shell 1 which contains a screw element 2 attached to the inside, circumferential surface of the cylindrical shell. The various convolutions of the screw element extend substantially the same distance from the inside circumferential surface of the cylindrical shell to define a central aperture 3 which extends the entire length of the main conveyor. Any type of conventional driving means can be utilized in order to rotate the main conveyor. One typical type of driving system comprises a gear 4 which is provided on the peripheral surface of the cylindrical shell, said gear being adapted to engage with a second gear 5 which is driven by a motor 6. The cylindrical shell is cradled and supported by a plurality of rollers 7 which are rotatably supported by roller arms 8 which, in turn, are supported by the support structure 9. Here again, the support system disclosed herein is merely exemplary of many different types of support systems which can be utilized to support the spiral-type conveyor of the present invention. In order to facilitate moving the spiral conveyor from one location to the other, it can be advantageously mounted upon a tractor bed or any power-driven chassis diagramatically illustrated by element 10 in FIGS. 1 and 5.

As previously stated, the main spiral conveyor of FIG. 1 can be utilized by itself as a conveying element. However, one of the advantageous features of the present invention is that the main conveying element of FIG. 1 can be increased in its length by combining it with at least one additional female spiral conveyor of FIG. 2. FIG. 2 comprises a hollow, cylindrical shell 11, into which is pressed a U-shaped groove or channel 12 which has a spiral shape and which extends towards the center of the cylindrical shell, defining therein a central aperture 13. Thus, when looking in the axial direction, the additional spiral conveyor of FIG. 2 has substantially the same shape as the main spiral conveyor of FIG. 1 with the exception that the main spiral conveyor contains a male screw element whereas the additional spiral conveyor of FIG. 2 contains a female screw element which is adapted to receive the male screw element of FIG. 1. Also, the diameter of the additional cylindrical shell is slightly smaller than that of the main cylindrical shell. The right-hand portion of FIG. 2 shows how the additional spiral conveyor can be screwed into the main spiral conveyor Advantageously, two additional screw elements can be utilized, and as shown in FIG. 5, the length of the main conveyor can be almost doubled in size by moving the additional conveyors into the out of the main spiral conveyor.

FIG. 3 shows an end view of the main spiral conveyor shown in FIG. 1 and FIG. 4 shows the end view of one of the additional spiral conveyors.

Figure 6:
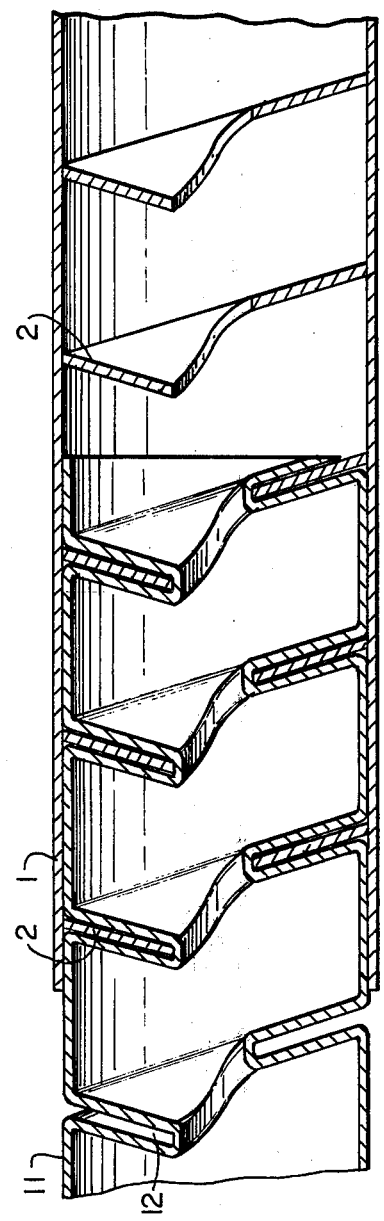
FIG. 6 shows, in cross section, how the screw element of the conveyor of FIG. 1 is screwed into the screw element of the conveyor of FIG. 2.
Figure 7:
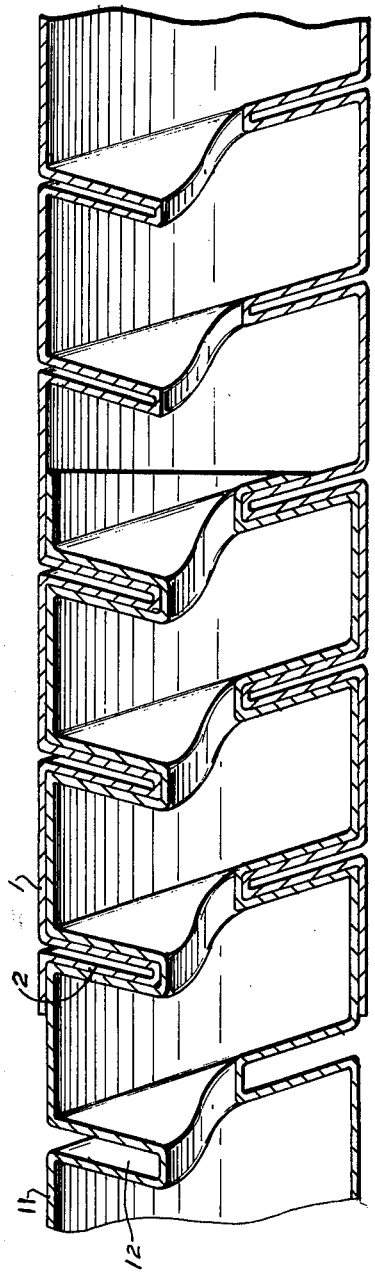
FIG. 7 shows, in cross section, the engaging relationship of FIG. 6 wherein both the male and female screw elements have a substantially U-shaped configuration.

FIG. 6 shows a cross section of FIG. 5 taken along line 6—6 of FIG. 5. As can be readily seen, the screw elements of the respective main and additional spiral conveyors nest into each other, thereby permitting the additional conveyor to be screwed into the main conveyor from both ends.

As previously stated, the main spiral conveyor and the additional spiral conveyors can be used individually or as shown in FIG. 5, in combination, to provide a spiral conveyor of variable length. It should also be recognized that a spiral tube conveyor of variable length could be provided utilizing screw elements having only U-shaped grooves 12 such as shown in FIG. 6.

In this situation, the grooves of one of the screw elements would have to be slightly larger than the grooves in the other screw element so that the larger U-shaped screw elements could receive the smaller U-shaped screw element. Similarly, a spiral tube conveyor of variable length could be made wherein two spiral conveyors having similar screw elements 2 could be screwed into each other so that the screw elements 2 of the respective spiral conveyors are contiguous with each other.

In one example of the present invention, the main conveyor can be approximately 30 feet long with the additional spiral tube conveyors having a length of about 15 feet, thereby providing a conveying system totaling about 60 feet in length. A plurality of 60-feet units can be combined together to cover longer conveying lengths. The main cylindrical shell can have a diameter of about 36 to 48 inches and can be provided with a spiral band which extends toward the center of the cylindrical shell or tube about 12 to 16 inches, running the entire length of the shell at a 20° angle and in a counterclockwise direction. The spiral band can be welded or bolted to the inside surface of the cylindrical shell. The diameter of the additional spiral conveyors which screw into the main spiral conveyor have a cylindrical shell with a diameter of about 1 to 1½ inches smaller than the main conveyor. This will allow the 15-foot additional conveying sections to telescope and spiral back into the main spiral conveyor.

The entire unit can be driven by an electric motor and a gear reducer at a speed of approximately 32 to 120 rpm in a clockwise direction. The 15-foot additional conveyor sections can be extended or retracted by a pair of hydraulic cylinders 14 (see FIG. 3) attached to the carrier frame of the 15-foot section. The spiral tube conveyor of the present invention will be able to convey at 90° turns or greater, which is a substantial improvement over belt- or chain-type conveyors which cannot make such a radical change in direction without losing a substantial portion of its load. The main spiral tube conveyor can be mounted on a 30-foot chassis, which will move on a set of crawlers. The crawlers can be driven by an electric motor or a hydraulic motor. Four hydraulic cylinders will serve to raise or lower the entire chassis for the purpose of positioning the spiral tube conveyor. Advantageously, a bin 15 provided with a flat rubber conveyor belt 16 on its bottom can be positioned at the inlet and/or discharge end of the conveyor for facilitating the introduction and removal of the granular material to and from the conveying system. The inlet and the outlet conveying elements can be driven by either an electrical or hydraulic motor.

As can be readily seen, because the spiral tube conveyor of the present invention has an open center, problems of binding of the material being conveyed are substantially eliminated. Thus, in the case of mining coal, it may be even advantageous to wet down the coal in order to reduce the amount of dust in the air. This can be readily accomplished by providing water sprays above the inlet conveyor belt. The addition of water to the coal does not produce any binding problems which cannot be readily alleviated by utilizing the spiral tube conveyor of the present invention. The spiral tube conveyor of the present invention can at least double the present coal production because it can be increased in length and thus the conveyor can be extended from the point where the coal is removed from the ground to the point where it is loaded onto trucks or trains. Furthermore, because the spiral band is attached to the cylindrical shell and because the additional spiral tube conveyor which contains the pressed-in screw is integral with the cylindrical sleeve, the components of the extendable spiral tube conveyor of the present invention are very strong and durable.

Representative of the prior art is U.S. Pat. No. 2,845,167, which is directed to an auger conveyor having telescopic characteristics. However, the present invention is distinguishable from the teachings of U.S. Pat. No. 2,845,167 in the following manner 1. The screw element in the patent is driven by a centrally disposed axis, whereas because the screw in the conveyor of the present invention is attached to the cylindrical shell, the screw does not have a centrally disposed axis and, in fact, is driven by a driving means associated with the peripheral portion of the cylindrical shell. Thus, in the present invention, both the screw and the cylindrical shell rotate in unison whereas in the reference patent. The screw rotates separately from the cylindrical shell.

2. In the patent, the cylindrical sleeve telescopes into each other by a sliding motion, whereas according to the present invention, the telescoping is achieved by the nesting of the screw elements with each other as set forth hereinabove.

3. The conveyor of the patent is top or bottom loaded and the screw element has a shear point at the point of introduction of the material to be conveyed into the cylindrical sleeve. The conveyor of the present invention is axially loaded and, accordingly, has a corresponding lower profile when compared to the patent and, furthermore has no shear point where the material is introduced into the spiral conveyor.

4. The manner in which the screw element of the patent screws into itself is completely different from the present invention which can readily be seen by comparing FIG. 2 of the patent with FIG. 6 of the present application. Furthermore, the screw element of the patent is driven independent of the cylindrical shell, whereas in the present invention the screw element is integral with the cylindrical shell and, accordingly, by driving the cylindrical shell, the screw element is also driven.

It is readily apparent that the conveyor of the present invention is completely, structurally different when compared to the conveyor of the patent.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

It is claimed:

1. An extendable and retractable conveyor system which comprises a main spiral-type tube conveyor which includes a cylindrical shell containing a screw element which is integral with the cylindrical shell and extends radially from said shell toward the center thereof and at least one additional spiral-type tube conveyor which includes a cylindrical shell containing a screw element which is integral with the cylindrical shell and extends radially from said shell toward the center thereof, said additional spiral-type tube conveyor being slightly smaller than the main spiral-type tube conveyor, one of said conveyors being provided with a male screw element and the other of said conveyors being provided with a female screw element, said male screw element being in screw engagement with said female screw element, whereby rotation of one cylindrical shell with respect to the other causes extension or retraction of the conveyor system.

2. The spiral-type tube conveyor of claim 1, wherein the screw element is a separate element which is attached to the peripheral inner surface of the cylindrical shell.

3. The spiral-type tube conveyor of claim 1, wherein the screw element comprises a screw-type groove which extends radially from the surface of the cylindrical shell, said groove extending toward the center of said cylindrical shell so as to define a centrally disposed aperture which extends from one end of the conveyor to the other end thereof.

4. The spiral-type tube conveyor of claim 3, wherein the groove has a substantially U-shaped configuration.

5. The spiral-type tube conveyor of claim 3, wherein the screw-type groove is pressed into the cylindrical shell and thus is integral with said cylindrical shell.

6. The spiral-type tube conveyor of claim 3, wherein the screw-type groove is a separate element which is attached to a spiral slot disposed in the cylindrical shell.

7. The conveyor system of claim 1, wherein two additional spiral-type tube conveyors are utilized, each of said additional spiral-type tube conveyors being slightly smaller than the main spiral-type tube conveyor with the screw elements thereof being in screw-engaging relationship with opposite ends of the screw element of the main spiral-type tube conveyor.

8. The conveyor system of claim 1, wherein the screw elements of the main and additional spiral-type tube conveyors extend radially from the respective cylindrical shells toward the center of said cylindrical shells so as to define a centrally disposed aperture which extends from one end of the conveyor system toward the other end thereof.

9. The conveyor system of claim 1, wherein the main spiral-type tube conveyor is provided with a male screw element and the additional spiral-type tube conveyor is provided with a female screw element, said male screw element being in screw engagement with said female screw element.

10. The conveyor system of claim 9, wherein the female screw element has a substantially U-shaped configuration.

11. The conveyor system of claim 9, wherein both the male and female screw elements have a substantially U-shaped configuration.

12. The conveyor system of claim 1, wherein means are provided for rotating the additional spiral-type tube conveyor relative to the main spiral-type tube conveyor.

13. The conveyor system of claim 1, wherein means are provided for rotating the main spiral-type tube conveyor relative to the additional spiral-type tube conveyor.

14. The conveyor system of claim 1, wherein the main spiral-type tube conveyor and the additional spiral-type tube conveyor are portable.

15. The conveyor system of claim 1, wherein a conveyor belt is disposed at the inlet end of the conveyor system for the introduction of the material to be conveyed thereto.

16. The conveyor system of claim 1, wherein a plurality of additional spiral-type tube conveyors are utilized, said plurality of spiral-type tube conveyors being telescoped together to form a conveyor system having a variable length.

17. The conveyor system of claim 1, wherein a plurality of additional spiral-type tube conveyors are utilized for extension from one end of the main conveyor, each of said additional spiral-type tube conveyors being slightly smaller than the preceding conveyor.

18. The conveyor system of claim 16, wherein said additional spiral-type tube conveyors extend from both ends of the main conveyor.

* * * * *